May 8, 1956  T. F. PETERSON  2,744,707
HELICALLY-PREFORMED LASHING FOR CONNECTING
CABLES TO MESSENGER STRANDS
Filed May 3, 1952  3 Sheets-Sheet 1
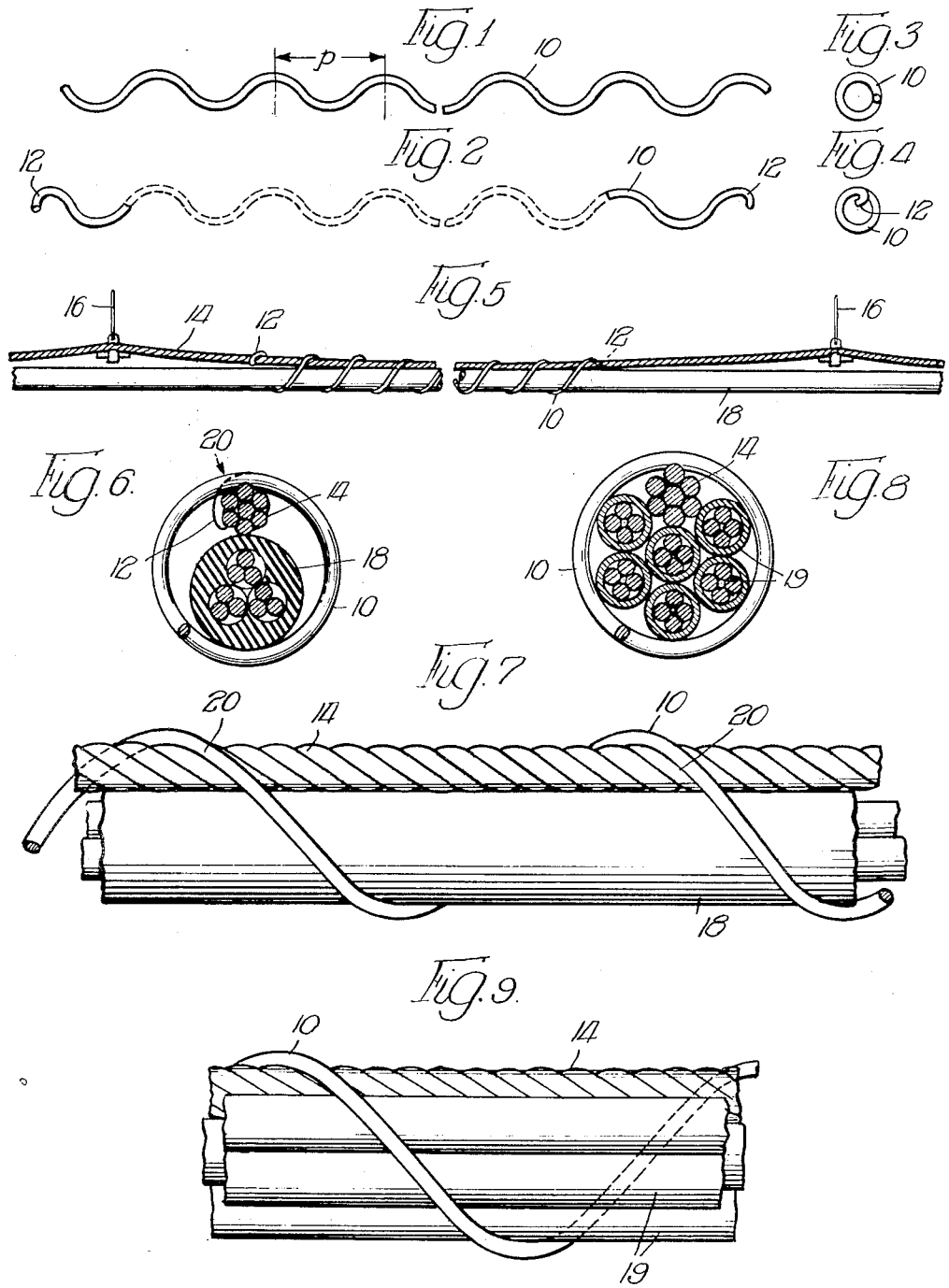
INVENTOR.
Thomas F. Peterson,
BY
Wilkinson Huxley Byron & Hume
Attys

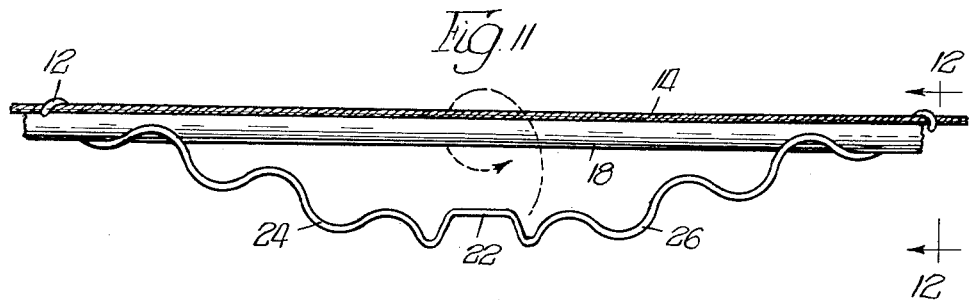
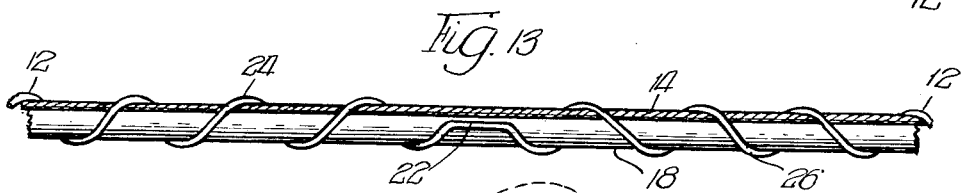
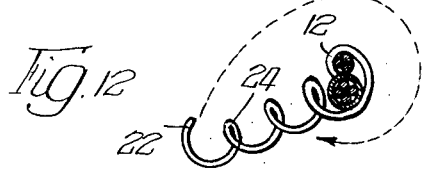
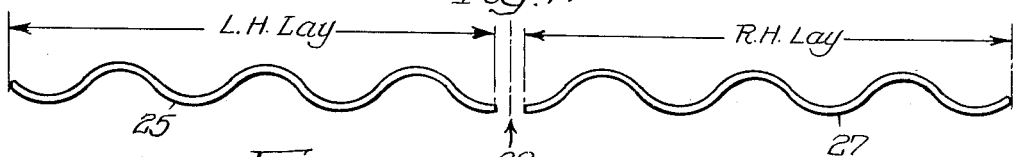
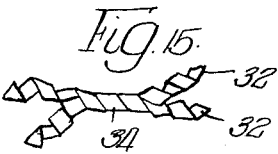
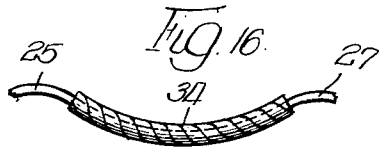

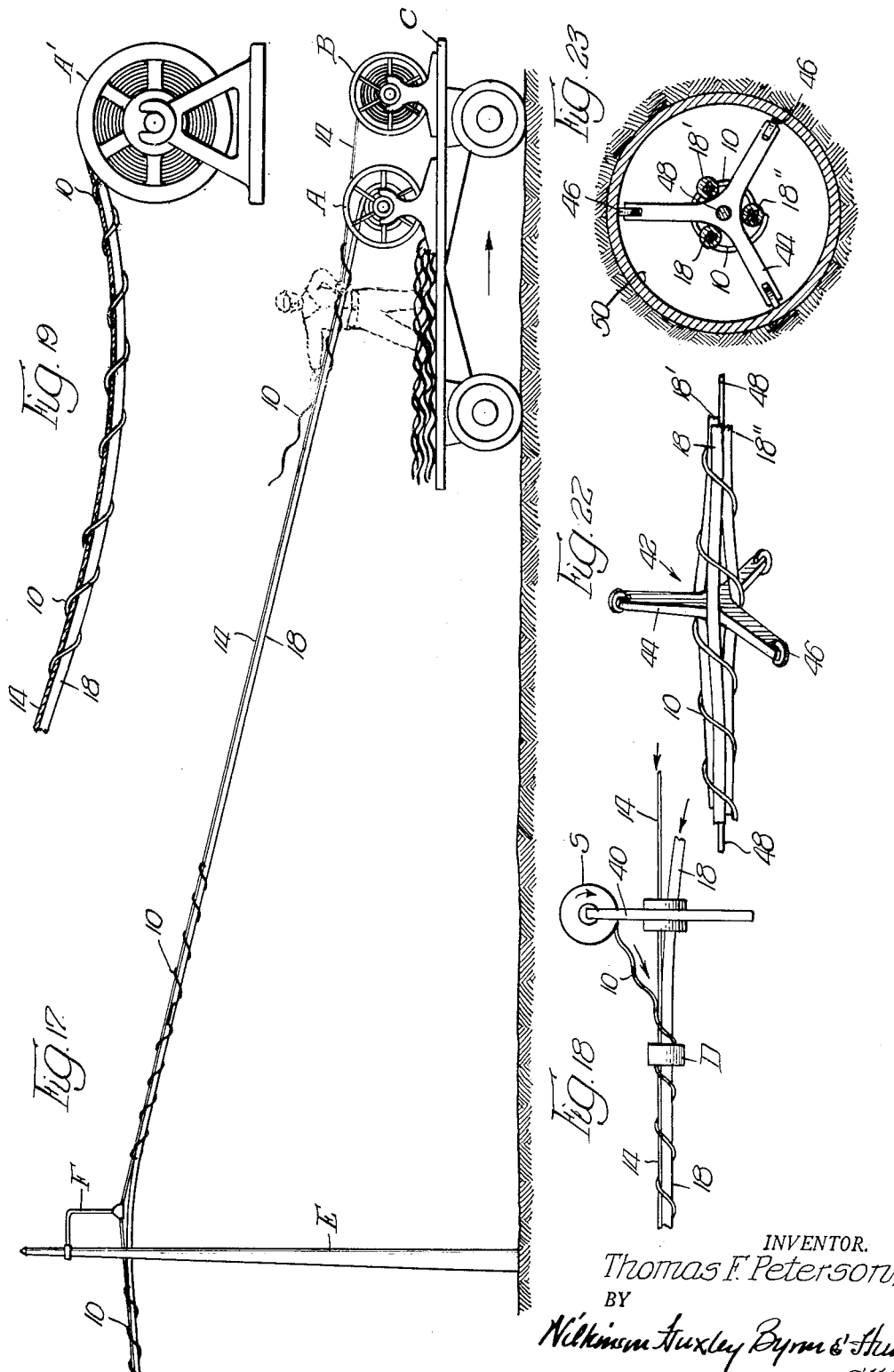

United States Patent Office 2,744,707
Patented May 8, 1956

2,744,707

HELICALLY-PREFORMED LASHING FOR CONNECTING CABLES TO MESSENGER STRANDS

Thomas F. Peterson, Shaker Heights, Ohio

Application May 3, 1952, Serial No. 285,989

8 Claims. (Cl. 248—61)

This invention relates to a simplified means and methods of procedure for hanging wire or cable-like bodies to messenger strands, as is commonly done in the electrical distribution field.

The invention is aimed at a simplification of the procedures presently in vogue, and at the provision of means which may be readily assembled at the factory or in the field without the need for special tools or skills in hanging cables to messenger strands.

Practices today vary from the provision of hanger loops individually disposed at predetermined axial spacing along a messenger strand to receive the electric cable or conductors, down to the lashing that is spun in place by a spinning frame in the field wherein a spool of straight wire is caused to rotate around a cable and messenger to lash them together.

All of these forms require considerable labor and equipment to install and are inconvenient to service and uneconomical to maintain.

Among the objects of the present invention is the provision of a helically-preformed lashing of the required strength, preferably made from steel, although specifically including molded plastics, etc., which lashing is either continuous or made in sufficiently short lengths to be applied in the field in spaced or overlapping relation along the cable and messenger strand to be joined, and which is formed with a sufficiently open helical pitch to be placed in encompassing relation to the cable and strand from the side of the latter without necessitating deformation of the lashing in excess of its elastic limit.

Another object is to provide such a preformed lashing with an inside helical diameter that is substantially equal to the overall diameter of the cable or cables and messenger strand, so that the latter are brought into close engagement by the lashing together of the parts and are caused to adhere together in use without relative axial movement.

Another object contemplates the provision of helically-preformed lashings made up of both right and left hand helices to each side of center, which lashings may be engaged upon the messenger strand or cable at the opposite ends of each lashing, while the middle part thereof is caused to turn about the messenger and cable until its helices are completely wound about them to secure them together.

A related object contemplates the provision of such a lashing of continuous length that is preformed into alternating right hand and left hand helical sections which can be applied from a stationary source of supply, such as a reel, the free end of which is advanced to the cable and messenger at a gradual angle and at a sufficient distance from the reel to provide flexibility. The amount of twisting necessary to install any one helical section in one direction is offset by the amount of twisting in the opposite direction, to install the next succeeding section; so that the operation is carried out back-and-forth in this manner without the lead from the stationary source of supply becoming unduly twisted in any one direction.

It is a further object to provide separate helices of opposite hand with the provision of additional means to connect them together at proximate ends to form such a lashing of right and left hand helics.

It is a further object to provide for the lashing of electrical conductors and the like to messenger strands with helically-preformed lashings to form a composite body that is flexible and subject to being wound upon reels with great facility for delivery and ultimate use in the field of installation, where it can be unwound and handled as a unit.

A related object is the provision of a method for installing electric conductors in suspended relation from a messenger, wherein the messenger and conductor are quickly bound together at the time they are erected to the overhead position in the field by the application of helically-preformed lashing units.

The invention finds especial applicability to small installations which are not of sufficient extent to warrant the use of spinning machines.

Referring now to the drawings—

Figure 1 is a typical helically-preformed lashing made of wire or other suitable material that has sufficient strength and stiffness to be used for the purposes intended, and, yet, which has sufficient resiliency in light of the open pitch of its form to be applied around a line or messenger strand from the side thereof without exceeding its elastic limit;

Figure 2 is a modified form of the invention showing the hooked ends on the principal form lashing;

Figures 3 and 4 are end views of Figures 1 and 2, respectively;

Figure 5 is a schematic side elevational view showing the application of the helically-preformed lashing to a suspended messenger strand and cable held thereto by the lashing;

Figures 6 and 7 are end and fragmentary side elevational views, respectively, enlarged to show the relationship of the lay of the strand in the messenger with regard to the helically-preformed lashing applied thereto;

Figures 8 and 9 are end and side elevational views corresponding to Figures 6 and 7, showing the application of a preformed lashing to secure a plurality of individual cables to a messenger;

Figure 10 is a helically-preformed lashing made with right and left hand helices to each side of center, and having hooked ends so as snugly to embrace the messenger at these terminal convolutions;

Figures 11 and 12 are front elevational and cross-sectional views, respectively, showing the application of the lashing of Figure 10 to a line and strand assembly;

Figure 13 illustrates the finished installation;

Figure 14 is a two-part right and left hand helical lashing;

Figure 15 is a connector for the right and left hand helices of Figure 14;

Figure 16 is a fragmentary representation of the right and left hand helices of Figure 14 as connected by the connector of Figure 15;

Figure 17 illustrates schematically certain procedures in the installation of suspended cables or lines in association with messenger strands, lashed together, in accordance with the teachings of the present invention;

Figure 18 is a schematic representation of how suspended cables or lines and messenger strands may be assembled and lashed together at a remote point, as at the factory, by means of the present invention;

Figure 19 illustrates a reel of lashed strand and line when it is ready for installation in the field;

Figure 20 is a detail of how adjacent helically-preformed lashings are overlapped in accordance with one practice of the present invention;

Figure 21 is a fragmentary view of an end of a helical lashing showing the application of tape or other suitable anti-chafing means thereto; and Figures 22 and 23 show application of the helically-preformed lashing as used in securing plural cables to roller bearing spiders having puller-strands for drawing cables through tubular conduits, etc.

Referring now more particularly to the drawings, the invention comprises a plurality of short lengths, or one continuous length, of helically-preformed material which may be round wire or rods of metal, or which may be in the form of round plastic bodies of the necessary resilience, or stiff flat sections of tapes or ribbons similarly constituted. These elements 10 may be of right or left hand helical lay, and are provided with an internal helical diameter that is substantially equal to the combined diameters of the cable or cables and messenger strands to be accommodated therein, which may be two or more in number, and which are formed to a pitch length $p$ that is of sufficient extent to permit the helices to be engaged around the cable and messenger strand assembly, from the side of the latter, without exceeding the yield point of the material of which the elements are composed.

In the embodiment of Figures 2 and 4, hooked terminals 12 are provided on the ends of the helical lashing so that the bight of the hook is, in internal dimension, in substantial agreement with the diameter of the cable or the messenger strand, and preferably the latter, so that they may be engaged thereon in tight fitting relation, which precludes axial movement between the assembled parts.

Figure 5 is an example of such an installation, in which a messenger strand 14 is suspended from conventional hangers 16 so as to support a cable 18 which is lashed thereto by the helical lashings 10 preformed in accordance with the present invention.

The relationship of parts in such an assembly is better exemplified in Figures 6 and 7, from which it will be seen that the messenger 14 is a 7-strand body of right hand lay, and the cable 18, for purposes of illustration, is shown as comprising three 3-wire strands laid together in a smooth insulating cover or protective sheath.

The helically-preformed lashing 10 is preferably formed with a pitch angle and direction of lay which agrees with the angle and direction of lay of the messenger strand 14 and the cable 18, so that at the points of contact therebetween, as indicated at 20 in Figures 6 and 7, the helical lashing engages the interstrand grooves of the messenger strands and resists axial displacement in relation thereto.

All of the parts are thus held together, and even on the occasion where installations are at steep angularity to the horizontal, any tendency of the parts to creep longitudinally in relation to the other parts, especially under conditions of vibration, is precluded. The hooked portions 12 are provided to engage the messenger strand so that the hooked portions enter between the strands of the messenger as shown in Figure 6 and grip it tightly so as to resist axial displacement. This arrangement has the further advantage of terminating the ends of the lashing at some point remote from the cable, which, when the latter is insulated, prevents accidental chafing between the ends of the lashing and the insulation that might otherwise occur to its damage. For this reason, although it is possible to terminate the lashings in engagement with the line, it is preferable to have their ends in engagement with the messenger strand.

The same general considerations apply to Figures 8 and 9 and have been described in connection with Figures 6 and 7, the principal difference being that in this instance, instead of the unitary cable 18, a plurality of individual stranded and insulated or shielded cables 19 are extended in parallel relation to the messenger 14, against which they are bound by the helically-preformed lashing 10 to the same effect as previously described.

In Figure 10 a modified form of a helically-preformed lashing is illustrated. This is composed with an integral reverse bend central section 22, to the left of which occurs a left hand helix 24, and to the right of which occurs a right hand helix 26. The reciprocal arrangement is also contemplated. Hooked portions 12 at the ends of the respective right and left helices are provided for the same purposes already discussed.

The device of Figure 10 is installed upon the assembled strand and cable 14 and 18, as shown in Figures 11, 12 and 13, by first engaging the hooks 12 over the messenger strand and then rotating the central portion 22 around the strand in clockwise direction, as viewed in Figure 12 (the view being taken along line 12—12 of Figure 11, looking in the direction of the arrows).

By continuing the rotation of the central portion, the right and left hand helices of the lashing are caused to wind around the cable and strand until they are bound together, as in Figure 13, with the central loop portion 22 curved in snugly around and against the cable 18.

A modified arrangement for accomplishing this same type of lashing is illustrated in Figures 14 to 16. Here helices of opposite hand, 25 and 27, are brought together at confronting end portions, as at 28, and a tubular element, such, for example, as one made up of a plurality of helically-preformed strips 30 and 32 of mutually conforming size and shape, is placed around the adjacent ends of the helices to enclose them by a helical tube 34, which in this example is the result of the mutual interwrapping and closing of the plastic helices 30 and 32 shown in Figure 15. These plastic helices are essentially diminutive embodiments of those disclosed in my Patent No. 2,275,019.

The inside diameter of the tubular member 34 is fifteen or twenty per cent smaller than the diameter of the stock from which the helices 25 and 27 are made, and thus it exerts a strong gripping action upon the stock and resists the axial separation of the helices. When the lashing as shown in these figures is finally wound into position, using the practice illustrated in Figures 11 through 13, the connector 34 will lie in the same relative position as the central portion 22 of the assembly shown in Figure 13. The tubular connector 34 may comprise a metal sleeve soldered to the wire helices 25 and 27, or may comprise a flexible plastic tube slipped over the adjacent ends of the helices so as frictionally to link them together, or may otherwise take any form desired that is satisfactory for this purpose.

In Figure 17 there is illustrated a technique of assembly and installation made possible by the present invention. In this figure there is represented a lineman assembling a cable 18 with a messenger strand 14, which are paid, respectively, from reels A and B carried upon a movable platform C for stringing on poles E. The line and strand are brought together off of the reels A and B and are lashed by means of cut-lengths of helically-preformed lashings 10 which are installed by the operator as the platform C is moved along the line of the poles. The lashings 10 may be of the reverse hand type, as shown in Figures 10 through 16, or may be of the uniform hand type of Figure 1. As the assembly proceeds, the messenger is connected to the overhead hanger brackets which are schematically represented at F on the poles, and the cable 18 is accordingly suspended from the messenger by the lashings 10. Alternatively, the messenger strand may be installed upon the poles in advance of the cable, in which case only the cable is advanced from a portable reel or other suitable source of supply and is lashed to the already installed messenger by the preformed lashings 10.

In Figure 18 there is illustrated one method of laying together relatively endless lengths of messenger strand 14 and cable 18, through some suitable closing device, as is represented by the die D. In this case a continuous supply of the helically-preformed lashing 10 of recurrently reversing helical direction is provided upon a spool or other suitable carrier S, which is caused to reciprocate around the axis of advance of the strand and line upon a rocking frame 40. The composite line and strand thus provided can be stowed upon a reel A' as viewed in Figure 19, from which it may be paid at the scene of installation, and suspended in the manner illustrated in Figure 17. The helical lashing 10 does not impair the flexibility of the assembly, and it thus becomes possible for electric cables and messenger strands to be pre-assembled, spooled, and delivered at the scene of application for installation as a unitary group.

The present invention is in contrast to preexisting techniques, where non-preformed soft lashing wire is used in more or less continuous lengths. Such lashings have presented problems wherever the lashing wire is terminated or cut. These problems have proved particularly bothersome at poles, at splices, and where a lashing wire may be severed. Where the preformed continuous lashing of the present invention is employed, these problems are eliminated, since the lashing can be cut and removed at any place along the line without destroying the extent to which the remainder of the lashing adheres to its position, and this without the need for end fastenings to take up tensile stress. In other words, the preformed set in the wire makes it adhere to the conductor and messenger strand without the need of extraneous ties, clamps, or fittings.

In many instances, the inside diameter of the lashing helix will substantially equal the overall diameter of the cable and messenger assembly. Where it is necessary to guard against axial displacement, a slightly less internal diameter of lashing might profitably be employed to increase the friction between the parts to engage the interstrand grooves of the messenger and to grip the sheath of the cable by indentation therein. In other locations and uses, such close positioning of the several parts may be undesirable because of its airfoil effect as regards transverse winds or air flow. Closely lashed combinations are prone to vibrate and "gallop" under certain conditions of wind, which a spacing between the messenger and cable effectively arrests. In such cases, it is the intention of the present invention to provide a lashing helix with an internal diameter greater than the maximum overall diameter of the strand and cable assembly. This would provide adequate space between the strand and the cable to permit a flow of air therebetween so as to suppress the development of an airfoil which might lead to excessive vibration and galloping. Such a loose lashing has the further advantage of permitting the cable to hang vertically beneath and parallel to the strand 14.

Many installations of factory lashed messenger and cable using soft non-preformed wire present an unsightly appearance, due to the fact that after repeated bending incident to installation the cable frequently falls in any position with respect to the strand 14, to the top of it, to the side of it, and below it. The present invention, especially in the employment of the relatively loose lashing, prevents such malpositioning of the assembled parts.

In Figure 20 there is indicated a plurality of lashings 10, 10', which illustrates how the terminal ends of adjacent helices may overlap to form continuous support throughout the length of the installation.

A ball of tape or plastic T is illustrated as applied to the end of a typical lashing 10 to provide anti-chafing means for the prevention of destruction of insulation on the associated electrical conductors. Any suitable means for accomplishing this result is within the contemplation of the invention.

In Figures 22 and 23 there is illustrated an application of the teachings of the present invention in facilitating the threading of conductors through enclosed passageways, such as underground conduits. As shown in these figures, three cables 18, 18' and 18" are disposed in stranded relation to a spider 42, which has as many legs 44 as there are cables to be accommodated, and at the end of which legs are disposed rollers 46 in free turning relation. A succession of spiders is introduced within the cables as shown in Figure 22 at predetermined intervals along the length thereof and in any case in sufficient number to prevent the cables from dragging therebetween. Each spider is connected by a continuous high tensile strand 48 through its center with all other spiders, which in this instance takes the place of the messenger strand 14, and the whole assembly is lashed together by means of the helically-preformed lashings 10, which may be made in accordance with any of the modifications hereinbefore described, and which appear as shown in Figures 22 and 23 when installed. The span of the spiders is sufficient to bear upon the internal walls of the conduit 50, through which the cables are to be pulled, which is accomplished by first drawing a lead length tension strand 48 through the conduit, and with this as a pullerstrand drawing the cable assembly through the conduit without permitting the latter to drag, and with a minimum of effort due to the roller bearings 46. It is obvious that the number of cables and the shape and arrangement of spiders for giving effect to this final modification of the present invention may be varied to suit the needs of the particular installation.

I claim:

1. The method of lashing cables and the like to messenger strands, which includes prefabricating a helically-set lashing to a helical diameter sufficient to encompass a cable and strand and to a helical pitch of the same hand as the strand that is sufficiently open to admit the side application of the lashing to said cable and strand without exceeding the elastic limit of the stock from which the lashing is formed, paying out cable into essentially parallel adjacency with the messenger strand, applying the helical lashing alongside the cable and strand and while wrapping said lashing around them, engaging said lashing in the interstrand grooves of said strand.

2. The method of lashing cables and the like to messenger strands, which includes prefabricating helically-set lashings to a helical diameter sufficient to encompass a cable and strand and to a helical pitch sufficiently open to admit of the side application of the lashing to said cable and strand without exceeding the elastic limit of the stock from which the lashing is formed, said lashings being prefabricated to helices of opposite hand to each side of center whereby the application thereof to said cable and strand is effected by engaging each lashing at its opposite ends to said strand, and wrapping it around the latter by turning the central portion of the lashing around the common axis of said cable and strand in the proper direction to cause said opposite hand helices to wrap therearound and wind-up with the central portion bearing against the cable and strand assembly at the conclusion of the operation.

3. A new article of manufacture, comprising a cable and a co-extensive messenger strand lashed thereto, said lashing being of strong, stiff, resilient stock that is helically-preformed to an open pitch of the same hand as said strand and laid in surrounding relation to said cable and strand, the cross-sectional dimension and shape of said stock being such as partially to lie within the interstrand grooves of said messenger strand at its points of crossing the latter.

4. In combination with a plurality of roller bearing supports, a cable supported by said supports, a messenger strand connecting said supports co-extensively with said cable, and a helically-preformed lashing binding said cable and strand together in gripping relation to said supports.

5. A cable installation comprising, a messenger strand, a cable coextensive with major portions of said messenger strand, and a helically-preformed lashing element encompassing said strand and cable to lash them together, said lashing being restricted in helical diameter to seat in the interstrand grooves of said strand at points of crossing therewith, whereby relative axial movement between the several parts is precluded.

6. In a cable-messenger suspension system, a stranded messenger, a cable-like body coextensive with said messenger, a helically-preformed open-pitch helix of stiff resilient material lashing said messenger and body together, the hand of said helix agreeing with the hand of lay of the strands in said messenger, and the internal diameter of said helix being small enough to bind said messenger and body together, said helix seating in the interstrand groves of said messenger at points of crossing therewith.

7. The invention of claim 6, in which said helix has a second part of reverse hand to that described encompassing said messenger and body and joined to the first part centrally in a reverse loop that conforms to parts of said messenger and body assembly as viewed in cross-section.

8. Means for threading cables through conduits comprising a plurality of axially spaced roller supports, cable means extending along said supports and supported thereby, a tension strand connecting said supports coextensively with said cable means, and a helically-preformed lashing binding said cable means and strands together and to said supports.

References Cited in the file of this patent

UNITED STATES PATENTS

| | | |
|---|---|---|
| 303,749 | Pyle | Aug. 19, 1884 |
| 446,214 | Wilson | Feb. 10, 1891 |
| 1,454,559 | Peach | May 8, 1923 |
| 2,202,538 | Selquist | May 28, 1940 |
| 2,222,652 | Carr | Nov. 26, 1940 |
| 2,230,611 | Coffin | Feb. 4, 1941 |
| 2,421,286 | Pyle | May 27, 1947 |
| 2,476,953 | Bennett | July 26, 1949 |
| 2,509,422 | Clapp | May 30, 1950 |
| 2,532,504 | Lapsley | Dec. 5, 1950 |
| 2,609,653 | Peterson | Sept. 9, 1952 |